Jan. 25, 1944.   K. L. WOODMAN   2,340,097
WARMING PAD
Filed April 17, 1942
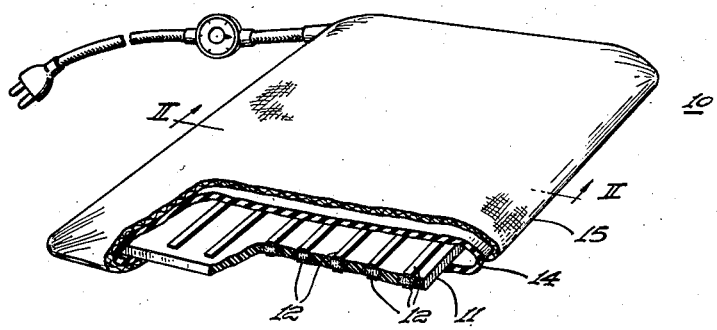
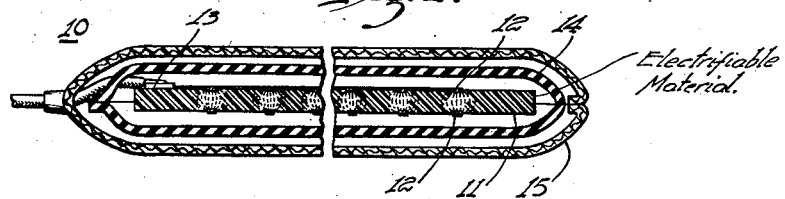
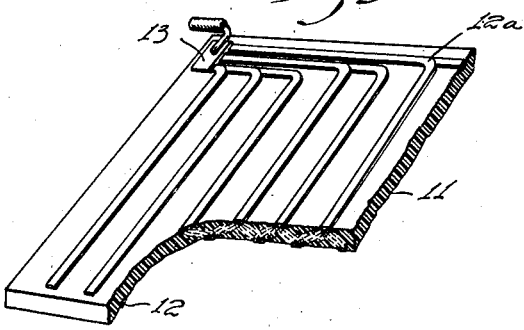
WITNESSES:
INVENTOR
Kenneth L. Woodman.
BY
ATTORNEY Patented Jan. 25, 1944

2,340,097

UNITED STATES PATENT OFFICE 2,340,097

WARMING PAD

Kenneth L. Woodman, Mansfield, Ohio, assignor to Westinghouse Electric & Manufacturing Company, East Pittsburgh, Pa., a corporation of Pennsylvania Application April 17, 1942, Serial No. 439,325

10 Claims. (Cl. 219—46)

My invention relates to electric heating or warming pads and, more particularly, to a warming pad having a flexible sheet-like heating element.

Electrical conducting sheet rubber has previously been used to make warming pad heating elements. However, such conducting rubber has always had a high specific resistivity requiring said element to be relatively thick and stiff. In contrast with the heretofore known heating pads I have provided means for energizing a rubber heating element of such character as to enable said rubber sheet to be relatively thin and highly flexible. Said means for energizing the thin rubber sheet involves the use of a large number of conductors in contact with the upper and lower surface of the rubber sheet so that all the current passing through the rubber heating element must pass directly through a small portion of the rubber sheet. A substantially uniform heat distribution is thus obtained.

It is, therefore, an object of my invention to provide a warming pad having a flexible sheet-like, lightweight heating element made of an electrically conducting rubber sheet-like member which will generate a substantially even heat throughout.

Another object of my invention is to provide a warming pad having a flexible sheet-like electrically conducting rubber heating element through which the electrical energy passes transversely so as to produce a substantially uniform heat throughout the surface thereof.

Still a further object of my invention is to provide a warming pad having an electrically conducting rubber heating element in which electrical conductors engage said element on opposite sides thereof so as to permit the use of an extremely thin and highly flexible sheet for a heating element.

Other objects of my invention will either be pointed out specifically in the course of the following description of a device embodying my invention or will be apparent from such description, reference being had to the accompanying drawing, in which:

Figure 1 is a perspective view of a warming pad embodying my invention in which a portion has been broken away for clearness;

Fig. 2 is a sectional view taken along the line II—II of Fig. 1; and

Fig. 3 is a perspective view illustrating a modified form of a heating element embodying my invention.

Referring to the accompanying drawing, there is shown a warming pad 10 having a thin, flexible, sheet-like, electrically conducting rubber heating element 11. The heating element 11 receives electric current from preferably a plurality of elongated electrical conductors 12 preferably of tin foil or the like, although they may be fine cylindrical conductors, if desired. These conductors are in contact with both the upper and lower surfaces of the element 11.

The heating element 11 preferably comprises a rubber composition which embodies acetylene carbon black or other electrical conducting blacks in the order of approximately 85 parts to 100 parts of rubber in accordance with the teachings of Bull et al. Patent No. 2,255,376, assigned to the United States Rubber Company. However, said electrically conducting rubber heating element may be formed of any other suitable material and in any desired manner.

The preferred tin foil conductors 12 are positioned upon the upper and lower surfaces of the substantially rectangularly-shaped rubber heating element 11. Said conductors 12 are arranged so as to provide a plurality of longitudinally extending parallelly disposed electrical paths of low resistivity on each main surface of the element 11. These conductors 12 are suitably secured to the opposite faces of the heating element to provide good electrical contact therewith, as by the use of glue or other adhesive means. The conductors 12 positioned upon the upper surface of the heating element are all connected to a terminal 13, while those positioned on the lower surface are connected to a diagonally opposite terminal (not shown), as will be readily understood. The conductors on each surface are, in this instance, all of the same polarity so that there is no direct passage of current along the surface of the heating element 11 between the parallelly disposed conductors. The conductors upon, say, the upper surface are therefore, of the opposite polarity from that of the conductors located upon the lower surface of the heating element.

It is, therefore, obvious that, inasmuch as all conductors 12 located upon opposite surfaces of the heating element 11 are, in this instance, of like polarity, the flow of the greater portion of the current through the heating element 11 will be along a transverse plane substantially normal to the upper and lower surfaces of the element. In other words, for example, the greater portion of the current flowing through the heating element 11 will pass directly from, say, the upper surface to the lower surface along the shortest possible path therebetween (see dotted lines Figs. 1 and 2). Passage of current through the rubber heating element 11 will then develop heat for the warming pad substantially uniformly throughout the entire surface thereof. It is to be understood that various compositions of rubber and acetylene carbon black, for example, may be employed to vary the resistivity of the heating element and, therefore, to vary the amount of heat developed thereby.

Any suitable thermostat (not shown) may be positioned in juxtaposition with the heating element to vary the flow of current therethrough, in accordance with the changes in temperature thereof, in keeping with established practice. The thermostat, in this instance, is not specifically shown or herein described inasmuch as any suitable thermostat may be employed.

A moisture resistant electrically insulating bag-like cover 14 is positioned about the heating element 11 to insulate said element and to prevent injury therefrom. In addition, said covering 14 prevents moisture from coming in contact with the surface of the heating element so as to prevent any faulty operation thereof. However, it is to be understood that sheets of insulating rubber may be vulcanized to the heating element 11 to provide the necessary moisture and electrical protection, if desired.

A heavy cloth or fabric covering 15 is then positioned over the heating element 11 and electrical insulating bag 14 to provide a pleasing appearance for the structure, and to permit such warming pad being used in direct contact with the body of a human patient, for example, in keeping with established practice.

Referring to Fig. 3, there is shown a modification of the heating element hereinabove described. This structure utilizes the same flexible electrically conducting rubber sheet, as a heating element 11. However, the preferred tin foil conductors 12a adhering to the opposite surfaces of said heating element 11, are horizontally displaced or staggered with respect to each other. In other words, the conductors 12a, while being parallelly positioned upon each surface, as hereinabove described, on the heating element are positioned substantially midway between those on the upper surface. The greater portion of the current flowing through the heating element will then pass along a plane substantially at an inclined angle to each surface of the element, see dotted lines Fig. 3.

By utilizing such an arrangement of the tin foil conductors 12a upon the rubber heating element 11, it is obvious that the electrical path between the conductors will be increased, for a given thickness of said element with respect to the device shown in Fig. 2. Accordingly, a greater resistance will be obtained for a given thickness of the rubber sheet when the conductors are arranged in such a diagonal manner. The heat output of such a heating element will, therefore, be somewhat lower than that in which the conductors are directly above each other.

If it be desired, the tin foil relatively low resistance electrical conductors 12 or 12a may be arranged in any desired manner, for example, in a sinusoidal arrangement, with the conductors on the opposite surfaces being either in line with each other or staggered. Further, said conductors may be arranged in any desired manner so as to vary the effective resistivity of the heating element, whereby the heat output of said element may be of any desired predetermined value.

It is, therefore, obvious that I have provided a heating pad having a highly flexible, extremely light-weight heating element, in which the heat developed thereby will be substantially uniform throughout its entire surface.

Various other modifications may be made in the device embodying my invention without departing from the spirit and scope thereof, and I desire, therefore, that only such limitations shall be placed thereon as are imposed by the prior art and the appended claims.

I claim as my invention:

1. A warming pad comprising a flexible sheet-like electrically conducting heating element of relatively high resistivity, and a plurality of electric conducting members of relatively low resistivity in contact with each of two faces of said element, those of opposite polarities being mounted on opposite faces of the element whereby the current passing therebetween will pass transversely through said element between said faces.

2. A warming pad comprising a flexible sheet-like electrically conducting heating element of relatively high resistivity, and a plurality of electric conducting members of relatively low resistivity in contact with each of two faces of said element, those of one polarity being arranged in substantially parallel relation upon one face of the element and those of opposite polarity being arranged in substantially parallel relation on the other face of said element.

3. A warming pad comprising a flexible sheet-like electrically conducting heating element of relatively high resistivity, and a plurality of electric conducing members of relatively low resistivity in contact with each of two sides of said element, those of one polarity being arranged in substantially parallel relation upon one side of the element and those of opposite polarity being arranged in substantially parallel relation on the other side of said element, said conductors being located so that they will be directly opposite from each other, whereby the greater portion of the current will pass transversely through the element along paths substantially normal to its conductor-carrying surfaces.

4. A warming pad comprising a flexible sheet-like electrically conducting heating element of relatively high resistivity, and a plurality of electric conducting members of relatively low resistivity in contact with each of two sides of said element, those of one polarity being arranged in substantially parallel relation upon one side of the element and those of opposite polarity being arranged in substantially parallel relation on the other side of said element, said conductors being staggered so that transversely they will be spaced apart from each other, whereby the greater portion of current flowing through the element will pass along paths inclined to both conductor-carrying surfaces.

5. A readily portable and flexible heating pad comprising a flexible heating element consisting of a sheet of electrically conducting rubber, and a plurality of electric conducting members in contact with each of two sides of said element, those of opposite polarities mounted on opposite sides of the element whereby the current flowing therebetween will pass transversely through said element.

6. A readily portable and flexible heating pad comprising a flexible heating element consisting of a sheet of electrically conducting rubber, and a plurality of relatively low-resistance electrical conductors in contact with each of two sides of said element, those of one polarity being arranged in substantially parallel relation upon one side of the element and those of opposite polarity being arranged in substantially parallel relation on the other side of said element.

7. A readily portable and flexible heating pad comprising a flexible heating element consisting of a sheet of electrically conducting rubber, and a plurality of relatively low-resistance electric conductors in contact with each of two sides of said element, those of one polarity being arranged in substantially parallel relation upon one side of the element and those of opposite polarity arranged in substantially parallel relation on the other side of said element, said conductors being located so that they will be directly opposite from each other, whereby the greater portion of the current will pass transversely through the element along paths substantially normal to its conductor-carrying surfaces.

8. A readily portable and flexible heating pad comprising a flexible heating element consisting of a sheet of electrically conducting rubber, and a plurality of relatively low-resistance electrical conductors in contact with each of two sides of said element, those of one polarity being arranged in substantially parallel relation upon one side of the element and those of opposite polarity arranged in substantially parallel relation on the other side of said element, said conductors being staggered so that transversely they will be spaced apart from each other, whereby the greater portion of current flowing through the element will pass along paths inclined to both conductor-carrying surfaces.

9. A readily portable and flexible heating pad comprising a flexible heating element consisting of a sheet of electrically conducting rubber, a plurality of relatively low-resistance conductors positioned on the top and bottom of said rubber sheet, those of opposite polarities being disposed on opposite sides of the sheet, and covering material enclosing said sheet rubber heating element, and conductors.

10. A readily portable and flexible heating pad comprising a flexible heating element consisting of a sheet of electrically conducting rubber, a plurality of relatively low-resistance conductors positioned on the top and bottom of said rubber sheet, those of opposite polarities being disposed on opposite sides of the sheet, terminal means for the conductors on the top of the sheet being located at one corner of said sheet and the terminal means for the conductors on the bottom of the sheet being located at the diametrically opposite corner, and covering material enclosing said sheet rubber heating element, and conductors.

KENNETH L. WOODMAN.